US012153960B2

(12) United States Patent
Sekiya et al.

(10) Patent No.: US 12,153,960 B2
(45) Date of Patent: *Nov. 26, 2024

(54) PRIORITY DETERMINATION SYSTEM, PRIORITY DETERMINATION METHOD, AND RECORDING MEDIUM

(71) Applicant: Panasonic Intellectual Property Management Co., Ltd., Osaka (JP)

(72) Inventors: Shoichiro Sekiya, Osaka (JP); Yuishi Torisaki, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,532

(22) Filed: Jul. 11, 2023

(65) Prior Publication Data

US 2023/0350714 A1    Nov. 2, 2023

Related U.S. Application Data

(63) Continuation of application No. 17/900,283, filed on Aug. 31, 2022, now Pat. No. 11,748,157, which is a
(Continued)

(30) Foreign Application Priority Data

Mar. 17, 2020  (JP) ................. 2020-046280

(51) Int. Cl.
*G06F 9/48* (2006.01)
*H04L 9/40* (2022.01)

(52) U.S. Cl.
CPC ........ *G06F 9/4881* (2013.01); *H04L 63/1425* (2013.01); *H04L 63/1433* (2013.01)

(58) Field of Classification Search
CPC ............... G06F 9/4881; H04L 63/1425; H04L 63/1433; H04L 63/1416; H04L 63/145; G06Q 10/0635; H04W 12/128
See application file for complete search history.

(56) References Cited

U.S. PATENT DOCUMENTS 10,873,596 B1 * 12/2020 Bourget ................. H04L 51/02
10,880,322 B1 * 12/2020 Jakobsson ............. H04L 51/08
(Continued)

FOREIGN PATENT DOCUMENTS

| CN | 107153914 | 9/2017 |
|---|---|---|
| DE | 112009001876 | 7/2011 |

(Continued)

OTHER PUBLICATIONS

Chakir et al., "An efficient method for evaluating alerts of Intrusion Detection Systems," 2017 International Conference on Wireless Technologies, Embedded and Intelligent Systems (WITS) Year: 2017 | Conference Paper | Publisher: IEEE.*
(Continued)

*Primary Examiner* — Roderick Tolentino
(74) *Attorney, Agent, or Firm* — Greenblum & Bernstein, P.L.C.

(57) ABSTRACT

A priority determination system incudes a processor, a terminal, and a memory. The processor obtains anomaly data items, each indicating an anomaly in a corresponding one of moving bodies, and obtains state data items, each indicating a state of a corresponding one of the moving bodies. The processor calculates, for each anomaly data item, a risk value indicating a risk of the anomaly based on a state data item of the corresponding one of the moving bodies, determines a priority of a task for dealing with the anomaly indicated by each anomaly data item based on the risk value, and provides an output to the terminal to execute the task. The terminal displays an alert related to at least one of the
(Continued)

priority of the task, the risk value, or an estimated dealing time required for completing the task.

20 Claims, 4 Drawing Sheets

Related U.S. Application Data continuation of application No. PCT/JP2021/000425, filed on Jan. 8, 2021.

(56) References Cited

U.S. PATENT DOCUMENTS

| | | | | |
|---|---|---|---|---|
| 11,457,024 | B2* | 9/2022 | Bindal | G06Q 10/0635 |
| 2003/0229509 | A1* | 12/2003 | Hall | G06Q 30/0278 |
| | | | | 705/305 |
| 2005/0209769 | A1 | 9/2005 | Yamashita et al. | |
| 2011/0140874 | A1 | 6/2011 | Tauchi et al. | |
| 2012/0143650 | A1* | 6/2012 | Crowley | G06Q 10/0635 |
| | | | | 726/25 |
| 2018/0025157 | A1* | 1/2018 | Titonis | H04W 12/128 |
| | | | | 726/22 |
| 2019/0124042 | A1* | 4/2019 | Thomas | H04L 63/1491 |
| 2020/0162497 | A1* | 5/2020 | Iyer | H04L 63/164 |
| 2020/0180618 | A1* | 6/2020 | Ohmura | B60W 50/12 |
| 2020/0202705 | A1 | 6/2020 | Sakai et al. | |
| 2021/0004704 | A1* | 1/2021 | Dang | G06F 3/0482 |
| 2022/0319327 | A1* | 10/2022 | Nakamura | G08G 1/166 |

FOREIGN PATENT DOCUMENTS

| | | |
|---|---|---|
| JP | 2005-267505 | 9/2005 |
| JP | 2009-151648 | 7/2009 |
| JP | 2013-003896 | 1/2013 |
| JP | 6298004 | 3/2018 |
| JP | 2019-175070 | 10/2019 |
| JP | 2020-102159 | 7/2020 |
| KR | 10-2015-0052431 | 5/2015 |
| WO | 2010/013826 | 2/2010 |

OTHER PUBLICATIONS

Li et al., "An Intelligence-Driven Security-Aware Defense Mechanism for Advanced Persistent Threats," IEEE Transactions on Information Forensics and Security Year: 2019 | vol. 14, Issue: 3 | Journal Article | Publisher: IEEE.*

International Search Report (ISR) from International Searching Authority (Japan Patent Office) in International Pat. Appl. No. PCT/JP2021/000425, dated Apr. 6, 2021, together with an English language translation.

Written Opinion (WO) of the International Searching Authority (Japan Patent Office) in International Pat. Appl. No. PCT/JP2021/000425, dated Apr. 6, 2021, together with an English language translation.

Office Action from Japan Patent Office (JPO) in Japanese Patent Appl. No. 2020-046280, dated Nov. 15, 2022, together with an English language translation.

Office Action from German Patent and Trademark Office in German Patent Appl. No. 112021001648.2, dated Sep. 9, 2023, together with an English language translation.

* cited by examiner

FIG. 3A

| State data item of moving body | |
|---|---|
| Moving state | In motion |
| Location | Urban area |
| Type | Vehicle type A |

FIG. 3B

| Information item on vehicle type A | |
|---|---|
| Number of vehicles in market | 5,000 |
| Expected amount of damage | Less than profit in previous period |
| Purpose of use | Commercial vehicle |

FIG. 4

| State data item | | Multiplying factor |
|---|---|---|
| Number of vehicles in market | Less than 1,000 | x 1.0 |
| | Equal to or more than 1,000 and less than 10,000 | x 1.2 |
| | Equal to or more than 10,000 | x 2.0 |
| Expected amount of damage | Less than profit in previous period | x 1.0 |
| | Equal to or more than profit in previous period | x 2.0 |
| Purpose of use | Household vehicle | x 1.0 |
| | Commercial vehicle | x 1.2 |
| | Emergency vehicle | x 2.0 |
| Location | Rural area | x 1.0 |
| | Urban area | x 2.0 |
| Moving state | Stopped | x 1.0 |
| | In motion | x 2.0 |

| Anomaly | Task | Allocation ratio of risk value | Estimated dealing time |
|---|---|---|---|
| Anomalous communication in IVI | User notification | 0.10 | 1 second |
| | Connection block | 0.40 | 10 seconds |
| | Detailed analysis | 0.10 | 3,600 seconds |
| | Permanent patch delivery | 0.40 | 60 seconds |

PRIORITY DETERMINATION SYSTEM, PRIORITY DETERMINATION METHOD, AND RECORDING MEDIUM

PRIORITY DETERMINATION SYSTEM, PRIORITY DETERMINATION METHOD, AND RECORDING MEDIUM

CROSS REFERENCE TO RELATED APPLICATIONS

This is a continuation of U.S. patent application Ser. No. 17/900,283, filed Aug. 31, 2022, which is a continuation of International Patent Application No. PCT/JP2021/000425, filed Jan. 8, 2021, which claims the benefit of priority of Japanese Patent Application No. 2020-046280, filed Mar. 17, 2020. The entire disclosure of each of the above-identified documents is incorporated herein by reference in its entirety.

FIELD

The present disclosure relates to a priority determination system, a priority determination method, and a recording medium.

BACKGROUND

Up to now, disclosed is a device that notifies an operator of an alert with high accuracy in the case where an anomaly such as a security incident in an IT system occurs, the operator analyzing the content of the anomaly and managing the anomaly (for example, PTL 1). For example, in the device disclosed in PTL 1, the priority of the alert of which the operator is notified is determined based on the occurrence origin or occurrence frequency of the alert, whereby the operator can be notified of the alert with high accuracy based on the determined priority.

CITATION LIST

Patent Literature

PTL 1: Japanese Unexamined Patent Application Publication No. 2019-175070

SUMMARY

Technical Problem

However, the device disclosed in PTL 1 has room for improvement.

In view of the above, the present disclosure provides a priority determination system and the like that can achieve further improvement.

Solution to Problem

In accordance with an aspect of the present disclosure, a priority determination system includes: an anomaly obtainer that obtains anomaly data items each indicating anomaly in a corresponding one of moving bodies; a state obtainer that obtains state data items each indicating a state of a corresponding one of the moving bodies; a risk value calculator that calculates, for each of the anomaly data items, a risk value indicating a risk of the anomaly based on a state data item of the corresponding one of the moving bodies; a priority determiner that determines a priority of a task for dealing with the anomaly indicated by each of the anomaly data items, based on the risk value of the anomaly data item; and an outputter that provides output based on a result of the determination.

In accordance with another aspect of the present disclosure, a priority determination method includes: obtaining anomaly data items each indicating anomaly in a corresponding one of moving bodies; obtaining state data items each indicating a state of a corresponding one of the moving bodies; calculating, for each of the anomaly data items, a risk value indicating a risk of the anomaly based on a state data item of the corresponding one of the moving bodies; determining a priority of a task for dealing with the anomaly indicated by each of the anomaly data items, based on the risk value of the anomaly data item; and providing output based on a result of the determining.

In accordance with still another aspect of the present disclosure, the recording medium is a non-transitory computer-readable recording medium having recorded thereon a program for causing a computer to execute the above-described priority determination method.

Advantageous Effects

A priority determination system and the like according to an aspect of the present disclosure can achieve further improvement.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3A is a diagram illustrating an example of state data items.

FIG. 3B is a diagram illustrating an example of an information item on vehicle type A.

FIG. 4 is a diagram illustrating an example of multiplying factors for correcting a basic risk value.

DESCRIPTION OF EMBODIMENT

Embodiment

[Configuration of Priority Determination System]

The device disclosed in PTL1 does not consider a risk value indicating an anomaly risk which an alert itself has. Therefore, there is a possibility that anomaly with a high risk is ignored. Furthermore, when the same attack is carried out on a plurality of targets, it is difficult to determine which target among the targets to be prioritized to issue an alert.

Figure 1:
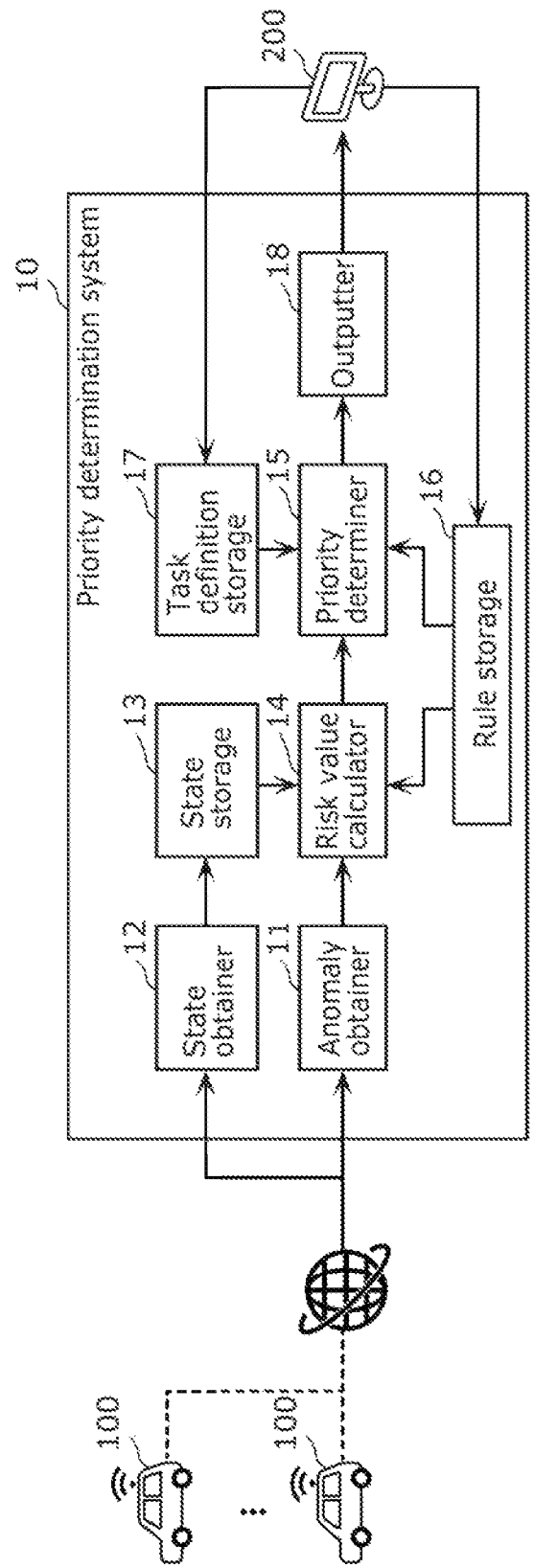
FIG. 1 is a configuration diagram illustrating an example of a priority determination system according to an embodiment.

In view of this, the following describes a priority determination system and the like capable of improving upon the related art, FIG. 1 is a configuration diagram illustrating an example of priority determination system 10 according to the embodiment, Note that FIG. 1 also illustrates moving bodies 100 (for example, automobiles) and terminal 200 that are communicably connected to priority determination system 10.

Each of moving bodies 100 is, for example, a vehicle such as an automobile on which an in-vehicle network such as a controller area network (CAN) is mounted, and is a connected car capable of wireless communication with priority determination system 10 and the like. For example, when an anomaly such as an attack from the outside, a fraud, or a breakdown occurs in the in-vehicle network or an electronic control unit (ECU) connected to the in-vehicle network, each of moving bodies 100 transmits an anomaly data item indicating the anomaly to priority determination system 10. Note that each of moving bodies 100 may transmit a log data item in the in-vehicle network to an anomaly detection server or the like that performs anomaly detection, and an anomaly data item indicating an anomaly detected based on the log data item may be transmitted from the anomaly detection server or the like to priority determination system 10. Moreover, each of moving bodies 100 transmits a state data item indicating its own state to priority determination system 10. For example, each of moving bodies 100 may transmit the state data item to priority determination system 10 constantly or in a particular cycle.

Terminal 200 is a terminal that is used by an analyst in a security operation center (SOC) or the like who monitors the plurality of (for example, several hundred or several thousand) moving bodies 100, collects anomaly information items, analyzes the content of an anomaly at the time of anomaly detection, and reports the result to a security incident response team (SIRT) or the like. For example, terminal 200 can utilize software such as security information and event management (SIEM), Priority determination system 10 is assumed to function as a server system in cooperation with SIEM or security orchestration automation and response (SOAR), As described later, output based on a result of determination of the priority of each task for dealing with an anomaly is provided from priority determination system 10 to terminal 200, and, based on the output, the analyst can effectively execute the tasks from among the large number of tasks for dealing with the anomalies that occur in the large number of moving bodies 100. Terminal 200 is capable of wired communication or wireless communication with priority determination system 10.

Priority determination system 10 is a computer for determining the priority of a task to be executed by the analyst, and is, for example, a server. Priority determination system 10 includes a processor, a memory, and a communication interface. The memory is a read only memory (ROM), a random access memory (RAM), and the like, and can store therein a program executed by the processor. Priority determination system 10 includes anomaly obtainer 11, state obtainer 12, state storage 13, risk value calculator 14, priority determiner 15, rule storage 16, task definition storage 17, and outputter 18. Anomaly obtainer 11, state obtainer 12, risk value calculator 14, priority determiner 15, and outputter 18 are realized by the processor or the like that executes the program stored in the memory. State storage 13, rule storage 16, and task definition storage 17 are realized by the memory, and the memory that stores therein the program, state storage 13, rule storage 16, and task definition storage 17 may be respective separate memories, and may be one memory. Constituent elements included in priority determination system 10 may be dispersedly arranged in servers.

Anomaly obtainer 11 obtains anomaly data items. The anomaly data items each indicate an anomaly in a corresponding one of moving bodies 100. For example, anomaly obtainer 11 obtains the anomaly data items from moving bodies 100 (or anomaly detection servers or the like) via the communication interface or the like included in priority determination system 10.

State obtainer 12 obtains state data items. The state data items each indicate a state of a corresponding one of moving bodies 100. For example, state obtainer 12 obtains the state data items from moving bodies 100, a roadside unit, a server, or the like via the communication interface or the like included in priority determination system 10. For example, each of the state data items includes at least one of: type information item indicating a type of moving body 100; location information item indicating a location of moving body 100; traffic information item indicating a traffic state at a location corresponding to the location information item; and moving state information item indicating a moving state of moving body 100. For example, state obtainer 12 may obtain the location information item and the moving state information item from moving body 100, may obtain the type information item, an anomaly occurrence state (for example, a prevalent attack), or the like that are managed by the server, from the server, and may obtain the traffic information item on a location at which an anomaly in moving body 100 occurs, from the roadside unit. Note that each of the state data items may be configured by further combining information items from another server or the like with these information items.

State storage 13 stores therein the state data items obtained by state obtainer 12. For example, the location information item includes an information item indicating a time-based location of moving body 100, and the moving state information item includes an information item indicating a time-based moving state of moving body 100. This makes it possible to recognize when and where each of moving bodies 100 is located and when and in what moving state each of moving bodies 100 is, by referring to the state data items stored in state storage 13.

Risk value calculator 14 calculates, for each of the anomaly data items, a risk value indicating a risk of the anomaly based on the state data item of the corresponding one of moving bodies 100. Details of risk value calculator 14 will be described later.

Priority determiner 15 determines the priority of each task for dealing with the anomaly indicated by each of the anomaly data items, based on the risk value of each of the anomaly data items. For example, priority determiner 15 determines the priority of each task based on: the risk value of each of the anomaly data items; and a predetermined index value of each task, the predetermined index value being, for example, at least one of a proportion of risk reduction resulting from executing of the task and a time required for executing the task. Specifically, priority determiner 15 determines the priority of each task based on: the risk value of each of the anomaly data items; and the predetermined index value of each task, the predetermined index value being, for example, the proportion of risk reduction resulting from executing of the task and the time required for executing the task. Details of priority determiner 15 will be described later. Note that other examples of the predetermined index value of each task may be a value indicating a load on the task and a value indicating the degree of influence on the risk. For example, priority determiner 15 makes the determination regularly, every time a task is executed, or every time an anomaly is detected.

Rule storage 16 stores therein: a rule that is used when risk value calculator 14 calculates the risk value; and a rule that is used when priority determiner 15 determines the priority, Details of these rules will be described later. Note that the information items stored in rule storage 16 may be updated in response to an instruction from terminal 200 or the like.

Task definition storage 17 stores therein a correspondence relation between the anomaly indicated by each of the anomaly data items and one or more tasks for dealing with the anomaly. Moreover, task definition storage 17 stores therein, for each task, a proportion of the risk reduced by executing the task (also referred to as an allocation ratio of the risk value) and an estimated dealing time required for completing the task. Details thereof will be described later. Note that the information items stored in task definition storage 17 may be updated in response to an instruction from terminal 200 or the like.

Outputter 18 provides output based on a result of the determination of the priority by priority determiner 15, to terminal 200. Details of the output from outputter 18 will be described later.

[Operation of Priority Determination System]

Next, an operation of priority determination system 10 is described with reference to FIG. 2.

Figure 2:
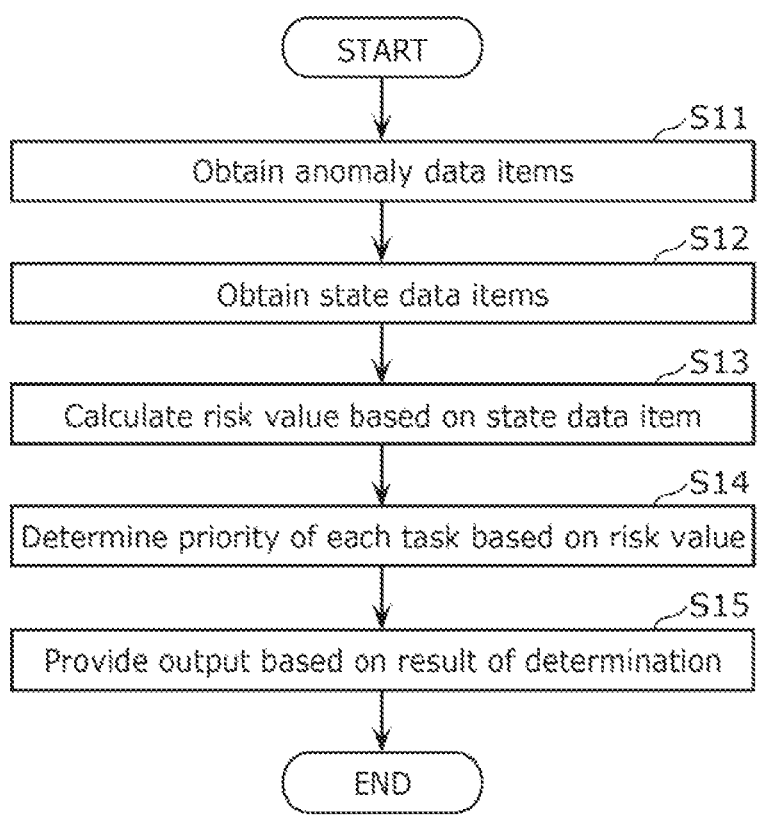
FIG. 2 is a flowchart illustrating an example of an operation of the priority determination system according to the embodiment.

FIG. 2 is a flowchart illustrating an example of the operation of priority determination system 10 according to the embodiment.

First, anomaly obtainer 11 obtains the anomaly data items each indicating the anomaly in a corresponding one of moving bodies 100 (Step S11). For example, because a large number of moving bodies 100 are monitored by terminal 200, anomaly obtainer 11 obtains a large number of the anomaly data items.

Next, state obtainer 12 obtains the state data items each indicating the state of a corresponding one of moving bodies 100 (Step S12). A specific example of the state data items is described with reference to FIG. 3A.

FIG. 3A is a diagram illustrating an example of the state data items.

As illustrated in FIG. 3A, the state data items include, for example, the moving state information item indicating that the moving state of moving body 100 when the anomaly occurs is "in motion." Moreover, the state data items include, for example, the location information item indicating that the location of moving body 100 when the anomaly occurs is an "urban area." Moreover, the state data items include, for example, the type information item indicating that the type of the moving body is "vehicle type A." Note that "vehicle type A" indicates that moving body 100 is, for example, such a moving body as illustrated in FIG. 3B.

FIG. 3B is a diagram illustrating an example of the information item on vehicle type A.

As illustrated in FIG. 3B, "vehicle type A" indicates: a vehicle type in which the number of vehicles in the market is 5,000; a vehicle type in which the expected amount of damage on the occurrence of a problem is less than the profit in the previous period; and a vehicle type in which the purpose of use is for a commercial vehicle.

Note that the process in Step S11 and the process in Step S12 may be performed in reverse order, and may be performed in parallel.

Next, risk value calculator 14 calculates, for each of the anomaly data items, the risk value of the anomaly based on the state data item of the corresponding one of moving bodies 100 (Step S13), For example, risk value calculator 14 first determines a basic risk value for each of the anomaly data items. The basic risk value is a value calculated based on the type of the anomaly, and can be determined (for example, calculated) using, for example, a score value by SIEM or a score value by cyber threat intelligence (CTI). The risk value calculated by risk value calculator 14 is, for example, a value obtained by correcting the basic risk value based on the state data item of the corresponding one of moving bodies 100, the basic risk value being determined based on the type of the anomaly. For example, as the risk value obtained by correcting the basic risk value becomes larger, the risk of the anomaly becomes larger. Here, multiplying factors for correcting the basic risk value are described with reference to FIG. 4.

FIG. 4 is a diagram illustrating an example of the multiplying factors for correcting the basic risk value.

For example, as illustrated in FIG. 4, rule storage 16 stores therein: a rule of correcting, to 1.0 times, the basic risk value of the anomaly that occurs in moving body 100 of the vehicle type in which "the number of vehicles in the market is less than 1,000"; a rule of correcting, to 1.2 times, the basic risk value of the anomaly that occurs in moving body 100 of the vehicle type in which "the number of vehicles in the market is equal to or more than 1,000 and less than 10,000"; and a rule of correcting, to 2.0 times, the basic risk value of the anomaly that occurs in moving body 100 of the vehicle type in which "the number of vehicles in the market is equal to or more than 10,000." For moving body 100 of the vehicle type in which "the number of vehicles in the market is less than 1,000," the number of vehicles in the market is small, an influence thereof is small even if the anomaly occurs, and hence the basic risk value of the anomaly that occurs in moving body 100 of the vehicle type in which "the number of vehicles in the market is less than 1,000" is not considerably corrected. On the other hand, for moving body 100 of the vehicle type in which "the number of vehicles in the market is equal to or more than 10,000," the number of vehicles in the market is large, an influence thereof is large if the anomaly occurs, and hence the basic risk value of the anomaly that occurs in moving body 100 of the vehicle type in which "the number of vehicles in the market is equal to or more than 10,000" is considerably corrected.

Moreover, for example, as illustrated in FIG. 4, rule storage 16 stores therein: a rule of correcting, to 1.0 times, the basic risk value of the anomaly that occurs in moving body 100 of the vehicle type in which "the expected amount of damage is less than the profit in the previous period"; and a rule of correcting, to 2.0 times, the basic risk value of the anomaly that occurs in moving body 100 of the vehicle type in which "the expected amount of damage is equal to or more than the profit in the previous period." For moving body 100 of the vehicle type in which "the expected amount of damage is less than the profit in the previous period," the expected amount of damage is small, and hence the basic risk value of the anomaly that occurs in moving body 100 of the vehicle type in which "the expected amount of damage is less than the profit in the previous period" is not considerably corrected. On the other hand, for moving body 100 of the vehicle type in which "the expected amount of damage is equal to or more than the profit in the previous period," the expected amount of damage is large, and hence the basic risk value of the anomaly that occurs in moving body 100 of the vehicle type in which "the expected amount of damage is equal to or more than the profit in the previous period" is considerably corrected.

Note that the correction values (multiplying factors) may be stored in association with the vehicle type, and may be stored in association with the number of vehicles in the market, the expected amount of damage, or the like. In the case where the correction values are stored in association with the number of vehicles in the market, the expected amount of damage, or the like, the vehicle type and the number of vehicles in the market, the expected amount of damage, or the like of each vehicle type may be stored as intermediate values in priority determination system 10, and may be obtained by inquiring of an external system by priority determination system 10.

Moreover, for example, as illustrated in FIG. 4, rule storage 16 stores therein: a rule of correcting, to 1.0 times, the basic risk value of the anomaly that occurs in moving body 100 as a "household vehicle"; a rule of correcting, to 1.2 times, the basic risk value of the anomaly that occurs in moving body 100 as a "commercial vehicle"; and a rule of correcting, to 2.0 times, the basic risk value of the anomaly that occurs in moving body 100 as an "emergency vehicle." Because moving body 100 as the "household vehicle" is less likely to be frequently used, the probability that a problem occurs is low even if the anomaly occurs, and hence the basic risk value of the anomaly that occurs in moving body 100 as the "household vehicle" is not considerably corrected. Because moving body 100 as the "commercial vehicle" is frequently used, the probability that a problem occurs is high if the anomaly occurs, and hence the basic risk value of the anomaly that occurs in moving body 100 as the "commercial vehicle" is more considerably corrected than the "household vehicle." Because moving body 100 as the "emergency vehicle" is a vehicle of great social importance, the basic risk value of the anomaly that occurs in moving body 100 as the "emergency vehicle" is considerably corrected.

Moreover, for example, as illustrated in FIG. 4, rule storage 16 stores therein: a rule of correcting, to 1.0 times, the basic risk value of the anomaly that occurs in moving body 100 located in a "rural area"; and a rule of correcting, to 2.0 times, the basic risk value of the anomaly that occurs in moving body 100 located in an "urban area." Because the rural area has a small number of people and is lightly trafficky, the basic risk value of the anomaly that occurs in moving body 100 located in the "rural area" is not considerably corrected. Because the urban area has a large number of people and is heavily trafficky, the basic risk value of the anomaly that occurs in moving body 100 located in the "urban area" is considerably corrected.

Moreover, for example, as illustrated in FIG. 4, rule storage 16 stores therein: a rule of correcting, to 1.0 times, the basic risk value of the anomaly that occurs in moving body 100 that is "stopped"; and a rule of correcting, to 2.0 times, the basic risk value of the anomaly that occurs in moving body 100 that is "in motion." Because moving body 100 that is "stopped" is at a stop and is less likely to come into a dangerous state even if the anomaly occurs, the basic risk value of the anomaly that occurs in moving body 100 that is "stopped" is not considerably corrected. Because moving body 100 that is "in motion" is moving and is more likely to come into a dangerous state if the anomaly occurs, the basic risk value of the anomaly that occurs in moving body 100 that is "in motion" is considerably corrected.

For example, in such a case as illustrated in FIG. 3A where: moving body 100 in which the anomaly occurs is in motion (the multiplying factor 2.0); this moving body 100 is located in the urban area (the multiplying factor 2.0); and vehicle type thereof is vehicle type A (that is, as illustrated in FIG. 3B, the number of vehicles in the market is 5,000 (the multiplying factor 1.2), the expected amount of damage is less than the profit in the previous period (the multiplying factor 1.0), and this moving body 100 is the commercial vehicle (the multiplying factor 1.2)), the risk value can be calculated in the following manner.

$$\text{Risk value} = \text{basic risk value} \times 2.0 \times 2.0 \times 1.2 \times 1.0 \times 1.2$$

In this way, risk value calculator 14 calculates, for each of the anomaly data items, the risk value of the anomaly by correcting the basic risk value based on the state data item of the corresponding one (moving body 100 in which the anomaly occurs) of moving bodies 100.

Next, priority determiner 15 determines the priority of each task for dealing with each of the anomaly data items, based on the risk value of each of the anomaly data items calculated by risk value calculator 14 (Step S14). The tasks for dealing with the anomaly are described with reference to FIG. 5.

Figures 5, 6:
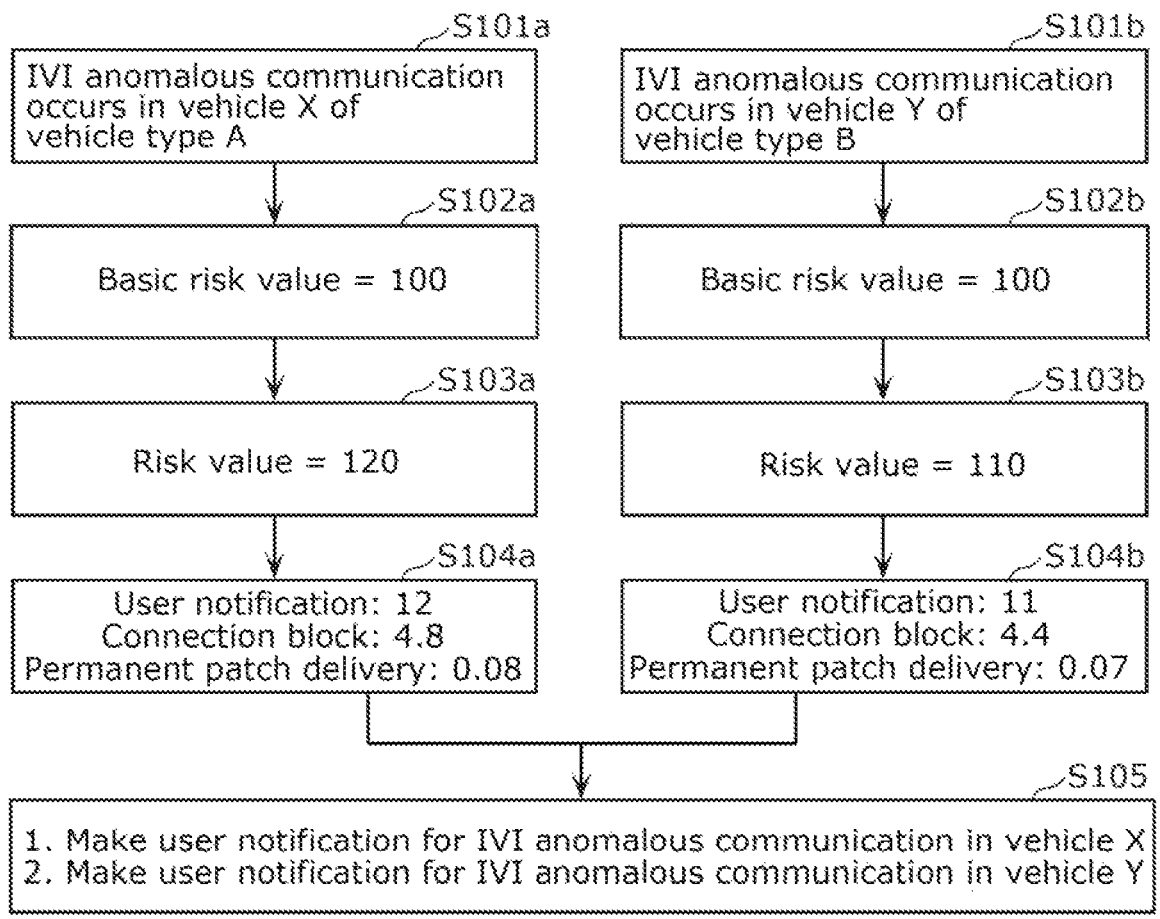
FIG. 5 is a diagram illustrating an example of tasks for dealing with an anomaly, allocation ratios of a risk value, and estimated dealing times.
FIG. 6 is a diagram for describing a specific example of an operation of the priority determination system when the same anomaly occurs in two moving bodies.

FIG. 5 is a diagram illustrating an example of the tasks for dealing with the anomaly, allocation ratios of the risk value, and estimated dealing times.

For example, in the case where the anomaly that occurs in moving body 100 is "anomalous communication in in-vehicle infotainment (IVI)," what is defined in advance as tasks for dealing with this anomaly are as follows: "user notification" for notifying a user of moving body 100, of the occurrence of this anomaly; "connection block" for blocking connection between the IVI and the in-vehicle network; "detailed analysis" for analyzing this anomaly in detail; and "permanent patch delivery" for delivering a program and the like to which countermeasures to this anomaly have been applied (in other words, a correspondence relation between a given anomaly and tasks for dealing with the given anomaly is stored in task definition storage 17). Moreover, each task is associated with the allocation ratio of the risk value and the estimated dealing time.

The proportion of the risk reduced by executing the "user notification" is 0.10 (10%), and the estimated dealing time required for completing the "user notification" is 1 second. That is, the risk value of the "anomalous communication in the IVI" can be reduced by 10% by spending 1 second executing the "user notification."

The proportion of the risk reduced by executing the "connection block" is 0.40 (40%), and the estimated dealing time required for completing the "connection block" is 10 seconds, That is, the risk value of the "anomalous communication in the IVI" can be reduced by 40% by spending 10 seconds executing the "connection block."

The proportion of the risk reduced by executing the "detailed analysis" is 0.10 (10%), and the estimated dealing time required for completing the "detailed analysis" is 3,600 seconds. That is, the risk value of the "anomalous communication in the IVI" can be reduced by 10% by spending 3,600 seconds executing the "detailed analysis."

The proportion of the risk reduced by executing the "permanent patch delivery" is 0.40 (40%), and the estimated dealing time required for completing the "permanent patch delivery" is 60 seconds. That is, the risk value of the "anomalous communication in the IVI" can be reduced by 40% by spending 60 seconds executing the "permanent patch delivery."

For example, the priority of each task is determined such that a higher priority is given to a task whose proportion of risk reduction resulting from executing is higher, and is determined such that a higher priority is given to a task that requires a shorter time for executing. That is, priority determiner 15 gives a higher priority to a task that can more reduce the risk in a shorter time. For example, rule storage 16 stores therein rules that can be expressed by the following equations for calculating the priority, and priority determiner 15 assigns the allocation ratio of the risk value and the estimated dealing time to these equations, to thereby determine the priority of each task. Note that, in following Equation 1 and Equation 2, $rv_{dec}$ is the amount of decrease in the risk value, rv is the risk value, $r_{ratio}$ is the allocation ratio of the risk value, p is the importance of the task (because a task with higher importance is desired to be executed with higher priority, p can also be regarded as the priority of the task), α is a tuning weight, and $t_{est}$ is the estimated dealing time.

[Math. 1]

$$rv_{dec} = rv \cdot r_{ratio} \quad \text{(Equation 1)}$$

[Math. 2]

$$p = \alpha \frac{rv_{dec}}{t_{est}} \quad \text{(Equation 2)}$$

Note that, if the above equations are used in the case where the allocation ratio of the risk value and the estimated dealing time are extremely small or extremely large, the priority of the task considerably changes, and hence the following equation may be used to determine the priority. Note that, in following Equation 3, α is equal to or more than 1.

[Math. 3]

$$p = \log(\alpha + rv_{dec}/t_{est}) \quad \text{(Equation 3)}$$

Note that, for example, the "permanent patch delivery" as the task for dealing with the "anomalous communication in the IVI" is a task that can be executed only after the "detailed analysis" is completed. Therefore, rule storage 16 stores therein such a rule that prevents the priority of the "permanent patch delivery" from being higher than the priority of the "detailed analysis." For example, the tuning weight is adjusted by a task, whereby the priority of a particular task can be made lower or higher.

For example, task definition storage 17 stores therein correspondence relations between: various anomalies other than the "anomalous communication in the IVI"; and one or more tasks, and priority determiner 15 can determine the priority of each task by referring to task definition storage 17 for the various anomalies. Note that, although the plurality of tasks are associated with the "anomalous communication in the IVI," an anomaly with which only one task is associated may exist.

In this way, priority determiner 15 determines the priority of each task based on the risk value calculated by risk value calculator 14. Specifically, priority determiner 15 gives a higher priority to a task whose proportion of risk reduction resulting from executing is higher (in other words, gives a lower priority to a task whose proportion of risk reduction resulting from executing is lower), and gives a higher priority to a task that requires a shorter time for executing the same (in other words, gives a lower priority to a task that requires a longer time for executing the same).

Then, outputter 18 provides output based on a result of the determination by priority determiner 15, to terminal 200 (Step 515), For example, outputter 18 may output, as the output based on the result of the determination, an alert that encourages execution starting from a task with a higher priority, to terminal 200, and terminal 200 may cause the analyst to execute tasks starting from the task with the higher priority by displaying the alert or providing audio output of the alert. Note that the determination of the priority and the output based on the result of the determination may be performed every time a new anomaly is detected, regularly, or in combination of these timings.

For example, a specific example when the same anomaly occurs in two moving bodies 100 is described with reference to FIG. 6.

FIG. 6 is a diagram for describing a specific example of an operation of priority determination system 10 when the same anomaly occurs in two moving bodies 100.

For example, it is assumed that the IVI anomalous communication occurs in vehicle X of vehicle type A and that the IVI anomalous communication occurs in vehicle Y of vehicle type B (Steps S101a and S101b).

Risk value calculator 14 determines that the basic risk values of the anomaly that occurs in vehicle X of vehicle type A and the anomaly that occurs in vehicle Y of vehicle type B are, for example, "100" (Steps S102a and S102b). The two anomalies are the same in type, and thus have the same basic risk value.

Next, risk value calculator 14 calculates, as "120," the risk value of the anomaly that occurs in vehicle X of vehicle type A, and calculates, as "110," the risk value of the anomaly that occurs in vehicle Y of vehicle type B (Steps S103a and S103b). For example, vehicle type A has a larger influence when the anomaly occurs than vehicle type B does, and hence the risk value of the anomaly in vehicle X of vehicle type A is larger than the risk value of the anomaly in vehicle Y of vehicle type B.

Next, for the anomaly that occurs in vehicle X of vehicle type A, priority determiner 15 determines that the priority (importance) of each task is the "user notification: 12," the "connection block: 4.8," and the "permanent patch delivery: 0.08," and, for the anomaly that occurs in vehicle Y of vehicle type B, priority determiner 15 determines that the priority (importance) of each task is the "user notification: 11," the "connection block: 4.4," and the "permanent patch delivery: 0.07" (Steps S104a and S104b), That is, the user notification for the IVI anomalous communication in vehicle X has the highest priority, then the priority becomes lower in order of the user notification for the IVI anomalous communication in vehicle Y, the connection block for the IVI anomalous communication in vehicle X, . . . , and the permanent patch delivery for the IVI anomalous communication in vehicle Y has the lowest priority, Although the anomaly that occurs in vehicle X of vehicle type A and the anomaly that occurs in vehicle Y of vehicle type B are the same "IVI anomalous communication," the state data items (specifically, vehicle type information items) are different therebetween, and the risk values are accordingly different therebetween. Therefore, there is a difference between: the priority of each task for dealing with the anomaly that occurs in vehicle X of vehicle type A; and the priority of each task for dealing with the anomaly that occurs in vehicle Y of vehicle type B.

Then, outputter 18 provides the output based on the result of the determination, to thereby first make the user notification for the IVI anomalous communication in vehicle X with the highest priority and then make the user notification for the IVI anomalous communication in vehicle Y with the second highest priority (Step S105). Subsequently, although not illustrated, the tasks may be performed in order from a task with a higher priority. Note that, for the sake of simplicity of description here, the description is given while focusing the two anomalies (specifically, the two anomalies that are the same in type), but terminal 200 monitors the large number of moving bodies 100 other than vehicles X and Y, and various anomalies other than these anomalies can occur. Therefore, the priority of each task is determined for each of the large number of anomalies, and the order of priority is set to the large number of tasks.

Effects and the Like

Priority determination system 10 includes: anomaly obtainer 11 that obtains anomaly data items each indicating anomaly in a corresponding one of moving bodies 100; state obtainer 12 that obtains state data items each indicating a state of a corresponding one of moving bodies 100; risk value calculator 14 that calculates, for each of the anomaly data items, a risk value indicating a risk of the anomaly based on a state data item of the corresponding one of moving bodies 100; priority determiner 15 that determines a priority of a task for dealing with the anomaly indicated by each of the anomaly data items, based on the risk value of the anomaly data item; and outputter 18 that provides output based on a result of the determination.

According to this feature, because the priority of each task for dealing with the anomaly is determined based on the risk value, an anomaly having a large risk value is less likely to be ignored. Moreover, even in the case where the same attack is implemented on moving bodies 100, the risk value is different depending on the states of attacked moving bodies 100, that is, the priority of each task determined based on the risk value is also different, and hence it is easier to determine which task should be executed for the anomaly in which moving body 100. As described above, priority determination system 10 that can achieve further improvement can be provided.

It is also possible that each of the state data items includes at least one of: a type information item indicating a type of a corresponding one of moving bodies 100; a location information item indicating a location of the corresponding one of moving bodies 100; a traffic information item indicating a traffic state at a location corresponding to the location information item; or a moving state information item indicating a moving state of moving body 100.

According to this feature, at least one of the type information item, the location information item, the traffic information item, and the moving state information item that can influence the risk of the anomaly can be reflected in the risk value.

It is further possible that the risk value is a value obtained by correcting a basic risk value based on the state data item of the corresponding one of moving bodies 100, the basic risk value being determined based on a type of the anomaly.

According to this feature, the basic risk value that can be easily determined based on the type of the anomaly is corrected based on the state data item, whereby the risk value can be easily calculated.

It is still further possible that the priority of the task for dealing with the anomaly indicated by each of the anomaly data items is determined based on (i) the risk value of the anomaly data item and (ii) a predetermined index value of the task.

According to this feature, the priority of each task can be easily determined based on the risk value of each of the anomaly data items and the predetermined index value of each task.

It is still further possible that the predetermined index value of the task for dealing with the anomaly indicated by each of the anomaly data items is at least one of (i) a proportion of risk reduction resulting from executing of the task or (ii) a time required for executing the task.

According to this feature, a higher priority can be given to a task whose proportion of risk reduction resulting from executing is higher, and a higher priority can be given to a task that requires a shorter time for executing.

It is still further possible that priority determiner 15 makes the determination regularly, every time the task is executed, or every time the anomaly is detected.

According to this feature, the determination of the priority can be automatically performed at any of these timings.

OTHER EMBODIMENTS

The above embodiment has been presented as an example of the technique disclosed according to the present application. However, the technique according to the present disclosure is not limited to these embodiments and may include other embodiments with appropriate modifications, substitutions, additions, or eliminations for the above embodiments. Furthermore, the embodiments may be combined.

For example, the example in which constituent elements included in priority determination system 10 are arranged in a server is described in the above-mentioned embodiment, but the present disclosure is not limited thereto. For example, anomaly obtainer 11, state obtainer 12, state storage 13, and risk value calculator 14 may be arranged in moving body 100. In this case, moving body 100 in which these constituent elements are arranged may obtain the state data item from a server that gathers the state data item of each of moving bodies 100, and moving bodies 100 may respectively share the state data items of moving bodies 100. Moreover, priority determiner 15 may be arranged in moving body 100. For example, the determined priority of a task (the importance of the task) may be added to an information item constituting an alert, and moving body 100 in which priority determiner 15 is arranged may notify a server or the like of the alert. Moreover, moving body 100 in which priority determiner 15 is arranged may inquire of a server including task definition storage 17 about the task for dealing with the anomaly, the allocation ratio of the risk value, the estimated dealing time, and the like, and moving bodies 100 may share these information items.

Moreover, for example, the example in which the priority of each task is determined based on: the risk value of each of the anomaly data items; and both of the proportion of risk reduction resulting from executing of the task and the time required for executing the task as shown in Equation 1 to Equation 3 given above is described in the above-mentioned embodiment, but the present disclosure is not limited thereto. For example, the priority of each task may be determined based on: the risk value of each of the anomaly data items; and any one of the proportion of risk reduction resulting from executing of the task and the time required for executing the task.

Moreover, for example, priority determination system 10 may process, as one anomaly data item, anomaly data items whose anomaly occurrence locations are close to each other, among the anomaly data items.

Moreover, for example, the example in which: terminal 200 is capable of wired communication or wireless communication with priority determination system 10; and priority determination system (outputter 18) provides the output based on the result of the determination of the priority, to terminal 200 is described in the above-mentioned embodiment, but the present disclosure is not limited thereto. For example, the determined priority of each task may be provided to an automation tool using SOAR or the like, and tasks may be automatically processed based on the determined priority.

Moreover, for example, functions of priority determination system 10 may be implemented in the automation tool using SOAR or the like, and the output based on the result of the determination of the priority may be provided from the automation tool.

Moreover, for example, moving body 100 is not limited to a vehicle, and may be a train, an aircraft (for example, an unmanned aircraft), a marine vessel, or the like.

It should be noted that the present disclosure may be implemented not only to priority determination system 10 but also to a priority determination method including steps (processing) performed by constituent elements included in priority determination system 10.

As illustrated in FIG. 2, the priority determination method includes: obtaining anomaly data items each indicating anomaly in a corresponding one of moving bodies (Step S11); obtaining state data items each indicating a state of a corresponding one of the moving bodies (Step S12); calculating, for each of the anomaly data items, a risk value indicating a risk of the anomaly based on a state data item of the corresponding one of the moving bodies (Step S13); determining a priority of a task for dealing with the anomaly indicated by each of the anomaly data items, based on the risk value of the anomaly data item (Step S14); and providing output based on a result of the determining (Step 515).

For example, the steps in the priority determination method may be executed by a computer (computer system). The present disclosure may be implemented to a program for causing the computer to execute the steps included in the priority determination method.

Furthermore, the present disclosure may be implemented to a non-transitory computer-readable recording medium such as a Compact Disc-Read Only Memory (CD-ROM) on which the program is recorded.

For example, if the program is implemented to a program (software), the steps are executed when the program is executed by using hardware resources of the computer, such as a central processing unit (CPU), a memory, an input/output circuit. In other words, the steps are executed when the CPU acquires data from the memory, the input/output circuit, or the like and performs calculation, or outputs the calculation results to the memory, the input/output circuit, or the like Moreover, the constituent elements included in priority determination system 10 according to the above embodiment may be implemented to a specialized circuit or a general purpose circuit.

It should be noted that each of the constituent elements included in priority determination system 10 according to the above embodiment may be implemented to a Large Scale Integration (LSI) which is an integrated circuit (IC).

The technique of integrated circuit is not limited to the LSI, and it may be implemented as a dedicated circuit or a general-purpose processor. It is also possible to use a Field Programmable Gate Array (FPGA), or a reconfigurable processor in which connection and setting of circuit cells inside the LSI can be reconfigured.

Further, if an integrated circuit technology that replaces LSI emerges from advances in or derivations of semiconductor technology, integration of the constituent elements included in priority determination system 10 may use the technology.

In addition, the present disclosure may include embodiments obtained by making various modifications on the above embodiments which those skilled in the art will arrive at, or embodiments obtained by selectively combining the elements and functions disclosed in the above embodiments, without materially departing from the scope of the present disclosure.

Further Information about Technical Background to this Application

The disclosures of the following patent applications including specification, drawings, and claims are incorporated herein by reference in their entirety: Japanese Patent Application No, 2020-046280 filed on Mar. 17, 2020, and PCT International Application No. PCT/JP2021/000425 filed on Jan. 8, 2021.

INDUSTRIAL APPLICABILITY

The present disclosure can be applied to, for example, a system that monitors a vehicle.

What is claimed is:
1. A priority determination system, comprising:
a processor;
a terminal; and
a memory including a program that, when executed by the processor, causes the processor to perform operations, the operations including:
    obtaining anomaly data items, each indicating an anomaly in a corresponding one of moving bodies;
    obtaining state data items, each indicating a state of a corresponding one of the moving bodies;
    calculating, for each of the anomaly data items, a risk value indicating a risk of the anomaly based on a state data item of the corresponding one of the moving bodies;
    determining a priority of a task for dealing with the anomaly indicated by each of the anomaly data items, based on the risk value of each of the anomaly data items; and
    providing an output based on a result of the determining to the terminal to execute the task;
wherein the terminal displays an alert related to at least one of the priority of the task, the risk value, or an estimated dealing time required for completing the task, and
the risk value is obtained by correcting a basic risk value based on the state data item of the corresponding one of the moving bodies, with the basic risk value being determined based on a type of the anomaly.
2. The priority determination system according to claim 1, wherein the terminal displays the alert that is encouraging execution starting from a task with a higher priority.
3. The priority determination system according to claim 1, wherein each of the state data items includes at least one of:
a type information item indicating a type of the corresponding one of the moving bodies;
a location information item indicating a location of the corresponding one of the moving bodies;
a traffic information item indicating a traffic state at the location corresponding to the location information item; or
a moving state information item indicating a moving state of the corresponding one of the moving bodies.
4. The priority determination system according to claim 1, wherein the priority of the task for dealing with the anomaly indicated by each of the anomaly data items is determined based on (i) the risk value of the anomaly data item and (ii) a predetermined index value of the task.

5. The priority determination system according to claim 4, wherein
the predetermined index value of the task for dealing with the anomaly indicated by each of the anomaly data items is at least one of (i) a proportion of risk reduction resulting from executing the task or (ii) a time required for executing the task.

6. The priority determination system according to claim 1, wherein the terminal provides an audio output of the alert.

7. The priority determination system according to claim 1, wherein the terminal displays the alert when a new anomaly is detected.

8. The priority determination system according to claim 1, wherein the terminal displays the alert regularly.

9. The priority determination system according to claim 1, wherein the terminal displays the alert regularly and also displays the alert when a new anomaly is detected.

10. A priority determination system, comprising:
a processor;
a terminal; and
an automation tool including a program that, when executed by the processor, causes the processor to perform operations, the operations including:
obtaining anomaly data items, each indicating an anomaly in a corresponding one of moving bodies;
obtaining state data items, each indicating a state of a corresponding one of the moving bodies;
calculating, for each of the anomaly data items, a risk value indicating a risk of the anomaly based on a state data item of the corresponding one of the moving bodies;
determining a priority of a task for dealing with the anomaly indicated by each of the anomaly data items, based on the risk value of each of the anomaly data items; and
providing an output based on a result of the determining to the automation tool;
wherein the automation tool displays an output based on the result of the determining of the priority provided from the automation tool, and
the risk value is obtained by correcting a basic risk value based on the state data item of the corresponding one of the moving bodies, with the basic risk value being determined based on a type of the anomaly.

11. The priority determination system according to claim 10, wherein the terminal displays the alert that is encouraging execution starting from a task with a higher priority.

12. The priority determination system according to claim 10, wherein
each of the state data items includes at least one of:
a type information item indicating a type of the corresponding one of the moving bodies;
a location information item indicating a location of the corresponding one of the moving bodies;
a traffic information item indicating a traffic state at the location corresponding to the location information item; or
a moving state information item indicating a moving state of the corresponding one of the moving bodies.

13. The priority determination system according to claim 10, wherein
the priority of the task for dealing with the anomaly indicated by each of the anomaly data items is determined based on (i) the risk value of the anomaly data item and (ii) a predetermined index value of the task.

14. The priority determination system according to claim 13, wherein
the predetermined index value of the task for dealing with the anomaly indicated by each of the anomaly data items is at least one of (i) a proportion of risk reduction resulting from executing the task or (ii) a time required for executing the task.

15. The priority determination system according to claim 10, wherein the terminal provides an audio output of the alert.

16. The priority determination system according to claim 10, wherein the terminal displays the alert when a new anomaly is detected.

17. The priority determination system according to claim 10, wherein the terminal displays the alert regularly.

18. The priority determination system according to claim 10, wherein the terminal displays the alert regularly and also displays the alert when a new anomaly is detected.

19. A priority determination system, comprising:
a processor;
a terminal; and
a memory including a program that, when executed by the processor, causes the processor to perform operations, the operations including:
obtaining anomaly data items, each indicating an anomaly in a corresponding one of moving bodies;
obtaining state data items, each indicating a state of a corresponding one of the moving bodies;
calculating, for each of the anomaly data items, a risk value indicating a risk of the anomaly based on a state data item of the corresponding one of the moving bodies;
determining a priority of a task for dealing with the anomaly indicated by each of the anomaly data items, based on the risk value of each of the anomaly data items; and
providing an output based on a result of the determining to the terminal to execute the task;
wherein the terminal displays an alert related to at least one of the priority of the task, the risk value, or an estimated dealing time required for completing the task, and
the priority of the task for dealing with the anomaly indicated by each of the anomaly data items is determined based on (i) the risk value of the anomaly data item and (ii) a predetermined index value of the task.

20. A priority determination system, comprising:
a processor;
a terminal; and
an automation tool including a program that, when executed by the processor, causes the processor to perform operations, the operations including:
obtaining anomaly data items, each indicating an anomaly in a corresponding one of moving bodies;
obtaining state data items, each indicating a state of a corresponding one of the moving bodies;
calculating, for each of the anomaly data items, a risk value indicating a risk of the anomaly based on a state data item of the corresponding one of the moving bodies;
determining a priority of a task for dealing with the anomaly indicated by each of the anomaly data items, based on the risk value of each of the anomaly data items; and
providing an output based on a result of the determining to the automation tool;
wherein the automation tool displays an output based on the result of the determining of the priority provided from the automation tool, and the priority of the task for dealing with the anomaly indicated by each of the anomaly data items is determined based on (i) the risk value of the anomaly data item and (ii) a predetermined index value of the task.

* * * * *